United States Patent [19]
Stone et al.

[11] 3,866,314
[45] Feb. 18, 1975

[54] DYNAMOELECTRIC MACHINE ROTOR ASSEMBLY DEVICE AND METHOD

[75] Inventors: William M. Stone; John M. Braunschwig, both of DeKalb, Ill.

[73] Assignee: General Electric Company, Fort Wayne, Ind.

[22] Filed: Aug. 14, 1973

[21] Appl. No.: 388,302

[52] U.S. Cl............ 29/598, 29/156.8 CF, 29/205 D, 29/430, 310/42, 310/62
[51] Int. Cl. ............................................. H02k 15/04
[58] Field of Search...... 29/596, 598, 205 R, 205 D, 29/430, 156.8 CF; 310/42, 60, 61, 62, 63, 89, 58

[56] References Cited
UNITED STATES PATENTS

| | | | |
|---|---|---|---|
| 1,734,541 | 11/1929 | Tedman | 29/156.8 CF |
| 2,970,234 | 1/1961 | Erickson | 310/63 |
| 3,243,617 | 3/1966 | Cunningham | 310/63 |
| 3,527,970 | 9/1970 | Wightman et al. | 310/63 |
| 3,643,119 | 2/1972 | Lukens | 310/60 |

Primary Examiner—Carl E. Hall
Attorney, Agent, or Firm—Joseph E. Papin

[57] ABSTRACT

A method of operating a single operator, multiple work station system for assembling components onto at least partially completed rotatable assemblies for a dynamoelectric machine. The method comprises removing a first completed rotatable assembly at one station from apparatus for deforming a first fan stamping secured to the rotatable assembly. A second rotatable assembly having a second fan stamping secured thereto is transferred from apparatus for securing the fan stamping at another station, and the second rotatable assembly is disposed on the deforming apparatus. A third rotatable assembly is then placed on the securing apparatus, and a third fan stamping is superposed on an end ring of the third rotatable assembly. The securing, and deforming apparatus are then actuated.

Apparatus for mounting components to a rotatable assembly and another method for operating a single operator, multiple work station for assembling components to a rotatable assembly for a dynamoelectric machine are also disclosed.

45 Claims, 15 Drawing Figures

DYNAMOELECTRIC MACHINE ROTOR ASSEMBLY DEVICE AND METHOD

CROSS-REFERENCE TO RELATED APPLICATION

Copending application Ser. No. 388,672 entitled: METHOD OF MOUNTING AND FORMING DYNAMOELECTRIC MACHINE COMPONENTS, filed on the same day as this application is a related application. Copending application Ser. No. 246,455 entitled DYNAMOELECTRIC MACHINE AND METHOD OF FORMING AND MOUNTING A COMPONENT THEREOF, filed Apr. 21, 1970 and now abandoned is also a related application.

BACKGROUND OF THE INVENTION

This invention relates to dynamoelectric machines and more particularly to methods of assemblying components thereof and to apparatus for mounting such components.

As is well-known in the dynamoelectric machine art, most electric motors and generators comprise a stationary member, generally referred to as a stator, in which a rotatable assembly, generally referred to as a rotor, is rotatably mounted. Typically, the stator comprises a laminated magnetic core having a cylindrical bore in which the rotor is received, and a plurality of winding receiving slots communicating longitudinally through the core between two core faces. Electrically energizable windings pass through the slots, which windings include end turns that pass between slots adjacent each of the two core faces to collectively form two annular groupings of winding end turns. Normally, the stator also comprises two end frames or a housing secured to the core in spaced relation therewith and with the annular grouping of winding end turns disposed therebetween. A bearing is typically carried by each of the end frames through which bearing the rotor drive shaft is journalled.

During operation of dynamoelectric machines of the type just described, the temperature of the stator windings may become sufficiently elevated to render the inclusion of air cooling means, such as fans, desirable for efficient machine operation and longevity. Heretofore, as exemplified by U.S. Pat. No. 3,243,617 to Cunningham, this has been accomplished by provision of circularly disposed integral fan blades or vanes projecting from one end of the rotor assembly concentrically within the annular grouping of winding end turns. Sets of arcuate vanes are riveted or staked to the other end of the rotor assembly which vanes project out from within an annular grouping of end turns closely adjacent the end of the grouping which end extends generally radially of the rotor shaft.

More recently a group of patents have issued, singularly and jointly, to Lawrance W. Wightman, namely U.S. Pat. Nos. 3,518,468, 3,518,471, 3,527,970, 3,538,598, 3,544,820, and 3,610,976. In these patents dynamoelectric machines are also shown having the aforementioned circularly disposed integral tan vanes projecting from the rotor ends coaxially of the rotor shaft. To two planar ends of these vanes two annuluses are secured, respectively, by a set of screws, facing the ends of the annular grouping of end turns. Fan vanes are formed in these concave surfaces to rotate the adjacent ends of the end turns upon rotation of the rotor. These patents involve individual mounting of the fan blades to an annulus using screws and individually tapped holes in the annulus, an unnecessary axial elongation of the machine, and an inhibition of the free flow of air around the winding end turns. Deployment in a particulate environment, such as clothes dryers, may lead to the further problem of lint blocking the air flow.

The disadvantageous features of the past motor fans have been overcome by the apparatus and method disclosed in the aforementioned copending patent application Ser. No. 246,455 the entire subject matter of which is specifically incorporated herein by reference. Very briefly, the copending patent application discloses a dynamoelectric machine having a rotor supported fan for cooling an annular grouping of stator winding end turns comprising an annular fan attached to rotor vanes and having an outer peripheral edge adjacent a set of fan vanes is bent over to extend about the outer periphery of the annular grouping of end turns. Such an annular fan arrangement provides good cooling and air flow and is not particularly troubled by a particulate environment and maintains the overall axial machine dimension within desired limits.

In addition to the foregoing, other disadvantageous features were encountered in the production or manufacturing stages of the past motor fans, for example, in past production, annular fans were produced by progressive dies which blank, punch, slit and form fans from a strip of relatively thin sheet steel afterwhich the fans are, for example, galvanized or zinc coated and then stored for subsequent attachment to a rotor. During plating and storing, the already formed vanes or blades of the fans become entangled with other vanes and were difficult to untangle thus not only causing storage problem but also wasting precious time at the production line. Further, the above mentioned entanglement along with other handling and production problems made it difficult to maintain desired tolerances of inside and outside diameter of past fan vanes. Thus, when staked to the rotor, the concentricity of the fan vanes relative to the rotor were often without tolerance limits, and in extreme situations, the fan vanes struck the end turns or the motor housing when turning.

It is accordingly a general object of the present invention to provide a method and apparatus in a multiple work station system for mounting components onto a rotatable assembly for a dynamoelectric machine which overcomes the disadvantageous features of the past methods and apparatus therefor, and this, as well as other objects and advantageous features of the present invention, will be in part apparent and in part pointed out in the specification which follows.

SUMMARY OF THE INVENTION

In general, a method in one form of the invention is provided for assemblying components onto a rotatable assembly for a dynamoelectric machine. The method includes removing a first completed rotatable assembly at one station from apparatus for deforming a first fan stamping secured to the rotatable assembly. A second rotatable assembly having a second fan stamping secured thereto is transferred from apparatus for securing fan stamping at another station, and the second rotatable assembly is disposed on the deforming apparatus. A third rotatable assembly is placed on the securing apparatus, and a third fan stamping is superposed on an end ring of the third rotatable assembly. The deforming apparatus and securing apparatus are then actuated.

In general and in one form of the present invention, a multiple work station system is provided with apparatus for mounting components onto at least partially completed rotatable assemblies for a dynamoelectric machine. The apparatus includes first means at one station for securing a generally flat fan stamping to an end ring of the rotatable assembly, and second means at another station for deforming the stamping when it is secured to the rotatable assembly thereby to extend fan vanes from the stamping.

BRIEF DESCRIPTION OF THE DRAWING

FIG. 2a is a perspective view of the rotatable assembly at one work station having a flat annular fan stamping superposed therein for staking while

FIG. 3a is a perspective view of the rotatable assembly at another work station with a centrifugal switch device superposed thereon for staking while

FIG. 5a is a perspective view showing the rotatable assembly having the fan stamping staked thereto with a peripheral portion of the fan stamping deformed to form a set of fan vanes projecting from the stamping while

DESCRIPTION OF THE PREFERRED EMBODIMENT

In the drawings, there is generally shown at 1 a multiple work station system for assembling components, such as a fan stamping 3 and a centrifugal switch device 5, onto a partially completed rotatable assembly 7, which comprises a rotor 9 mounted on a shaft 10, for a dynamoelectric machine not shown.

Figure 1:
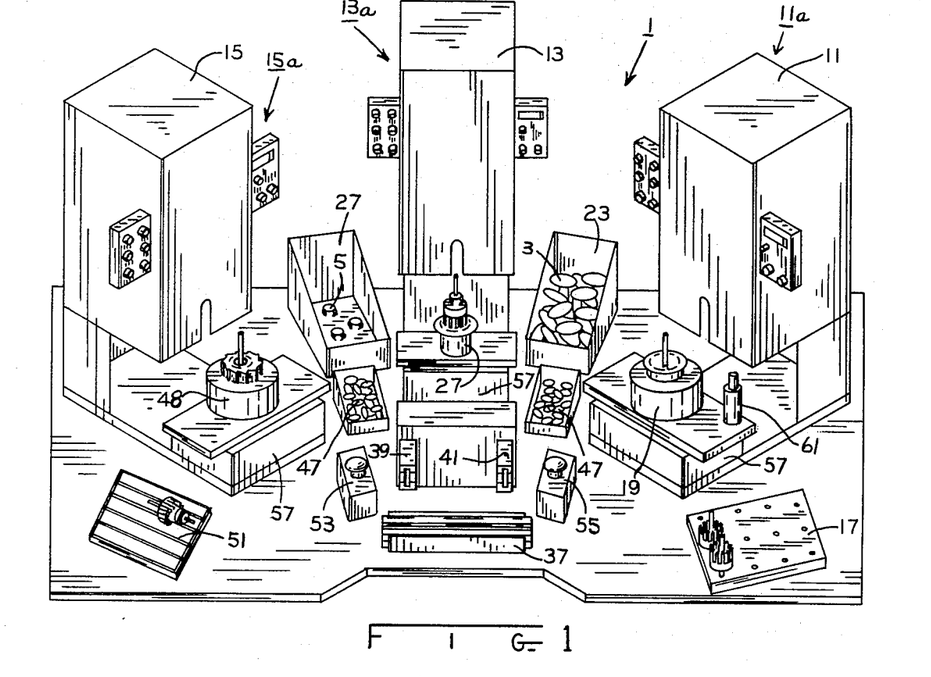
FIG. 1 is a perspective view of apparatus in one form of the invention in a multiple work station system for mounting components onto a rotatable assembly embodied in the present invention and teaching principles of a method of operating a single operator multiple work station system also in one form of the invention.
Figure 2A:
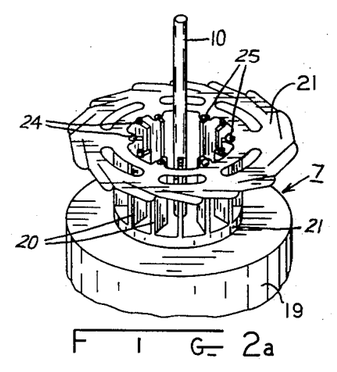
Figure 2B:
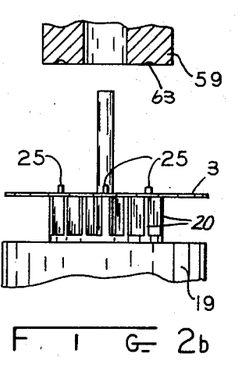
FIGS. 2b and 2c illustrate in cross section the staking sequence.
Figure 3A:
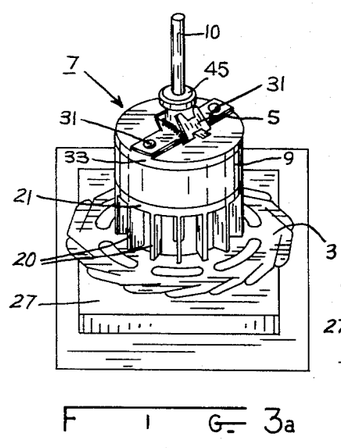
Figure 3B:
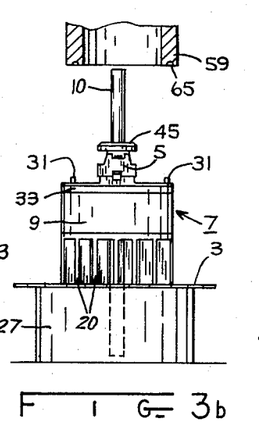
FIGS. 3b and 3c illustrate in cross section the sequential staking of that centrifugal switch device.

In FIG. 1 an operator normally is positioned facing generally toward a central one of apparatus or three presses 11, 13, and 15 which generally constitute work stations 11a, 13a, 15a of system 1, and the presses are substantially identical except for the tooling and force to be exerted during respective stages in the system. The operator has a source of partially assembled or completed rotatable assemblies, such as a rotor tree 17 or the like, and removes one of those rotatable assemblies from rotor tree 17, placing it in position on a support 19 of press 11 with a plurality of circularly disposed vanes 20, which are integral with an end ring 21 of rotor 9, pointing upwardly as illustrated in FIG. 2a. The generally flat annular fan stamping or member 3 would be taken from a source or supply thereof, such as a fan bin 23, and placed upon rotor end ring vanes 20 with a plurality of mounting or positioning indentures 24, which are provided on the fan stamping, in locating engagement with a plurality of studs 25 integrally formed on the end of the rotor vanes. Press 11 is then actuated to deform studs 25 thus staking fan stamping 3 to rotor vanes 20, as shown in FIG. 2b. This rotor next is removed from press 11, turned end for end and placed on a support 27 of press 13, as shown in FIGS. 3, 3a and 3b, after which centrifugal switch member or device 5 is placed over a pair of studs 31 integral with and projecting from an opposite end ring 33 of rotatable assembly 7. Press 13 is then actuated to deform studs 31 thus staking centrifugal switch member 29 to the rotor.

Figure 4A:
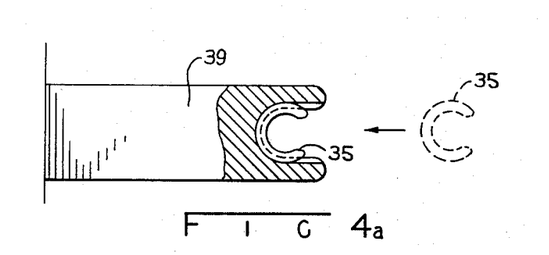
FIGS. 4a and 4b left side elevational views partially in cross section showing at another work station a fixture or holder for mounting retaining clips onto a shaft of the rotatable assembly.
Figure 4B:
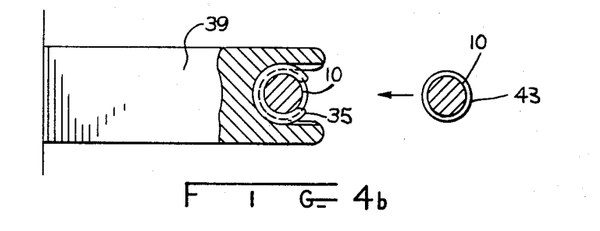

While press 13 cycles, the operator removes a pair of retaining means, such as clips 35 of FIGS. 4a and 4b from a source or supply thereof, such as a retaining clip bin 37 of FIG. 1, and places one of these clips in each of a pair of identical retaining clip holders or fixture means 39, 41. The space between retaining clip holders 39, 41 matches the predetermined space between a pair of clip accepting grooves 43 in rotor shaft 10, and thus rotatable assembly 7 is removed from support 27, turned so that shaft 10 is in a horizontal position, and forced into the retaining clip holders, as illustrated in FIG. 4b, to snap or mount both clips 35 into position in the accepting grooves on the rotor shaft.

A pair of thrust collars, such as nylon washers 45 of FIG. 3a, are removed from a supply or source thereof, such as a pair of thrust bearing bins 47, and slipped over opposite ends of rotor shaft 10, and rotatable assembly 7 is then removed from retaining clip holders 39, 41 and placed on support 48 of press 15. Press 15 when actuated, bends peripheral portions of fan stamping 3 downwardly away therefrom to form blades or vanes 49 thereon. The completed rotatable assembly 7 is then removed from support 45 and placed in a means for receiving and/or storing the completed rotatable assemblies, such as a rotor bin 51 or the like.

The time required to process each of rotatable assemblies 7 through system 1 may of course be materially reduced by having a rotatable assembly at each of stations 11a, 13a, 15a and simultaneously actuating presses 11, 13 and 15 while utilizing the cycle time of those presses to place retaining clips 35 in clip holders 39, 41 and perhaps to mount the retaining clips and thrust collars 45 on rotor shaft 10, as described above. Thus in normal operation four different rotatable assemblies 7 could be receiving four different operations simultaneously and would be sequenced through system 1 beginning with the operation of press 11 and ending with the operation of press 15. The particular point at which thrust collars 45 and retaining clips 35 are placed on rotor shaft 10 may be, as implied by FIG. 3a, prior to the operation of staking centrifugal switch device 5 to rotor end ring 33 or preferably will follow this staking operation.

After the transient cycling of the apparatus so as to have a rotatable assembly 7 at each stage or stations 11a, 13a, 15a of system 1, a typical cycle would require that the operator take two retaining clips 35 from bins 47 (one in each hand) and place one clip in each of retaining clip holders 39, 41. Completed rotatable assembly 7 is then removed from the bending press 15 and placed in rotor bin 51. Rotatable assembly 7 is then removed from staking press 13 and placed into retaining clip holders 39, 41, as illustrated in FIG. 4b, to snap retaining clips 35 onto rotor shaft 10. Thrust collars 45 are taken from bins 47 and placed over the two ends of shaft 10 being held in retaining clip holders 39, 41. This rotatable assembly 7 is then removed from retaining clip holders 39, 41, and thrust collars 45 moved along shaft 10 toward engagement with retaining clips 35 before placing the rotatable assembly in fan bending press 15. Another rotatable assembly 7 is then removed from fan staking press 11, and centrifugal switch device 5 is removed from bin 27 and placed over rotor shaft 10 into the position illustrated in FIG. 3a with the rotatable assembly placed in staking press 13. A new rotatable assembly 7 is removed from rotor tree 17 and placed in fan staking press 11, and a fan stamping 3 from fan bin 23 is superposed or placed on studs 25 of vanes 20, as in FIG. 2a wherein the operator would operate palm buttons 53, 55 to effect substantially simultaneous actuations of presses 11, 13 and 15. Palm buttons 53, 55 are sufficiently far apart that both hands of the operator are required to simultaneously depress these switches thus obviating the possibility of the operator having a hand in the path of travel of one of presses 11, 13 and 15 upon actuation thereof.

Figure 2C:
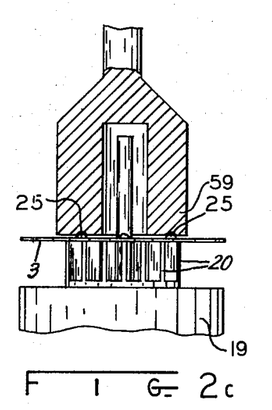
Figure 3C:
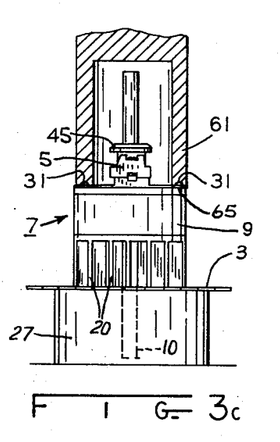

As noted earlier, presses 11, 13 and 15 are substantially similar, and their common characteristics will be discussed subsequently with reference to FIGS. 6 and 7; however, differing features of press 11 will be more fully understood considering FIG. 1 in conjunction with FIGS. 2a, 2b and 2c. Press support 19 is in turn supported on a bed 57 which is slidable between an "out" position, as illustrated in FIG. 1, and an "in" position where the support, bed and rotatable assembly 7 is underneath the overlying press structure and properly aligned with a press ram 59. The proper alignment may include the use of an alignment pin 61 if desired. When the operator actuates switches 53, 55 simultaneously, bed 57 slides rearwardly of press 11 to its "in" position into proper alignment, and ram 59 with a staking die 63 of FIG. 2b moves downwardly into staking or extruding engagement with studs 25 thereby to stake fan stamping 3 to rotor end ring vanes 20. Thereafter, ram 59 and staking die 63 retract upwardly, and bed 57 slides outwardly toward the operator to its " out" position thereby to facilitate the removal of the rotatable assembly 7 having stamping 3 staked thereto and placement of another or new rotatable assembly in support 19 for subsequent staking. Beds 57 of presses 13 and 15 cooperate with the respective movements of their rams 59 in a similar fashion; however, press 13 has a staking die 65 which is configured to engage and deform studs 25 to stake the centrifugal switch device 5 to rotor end ring 33, as illustrated in FIGS. 3b and 3c.

Figure 5A:
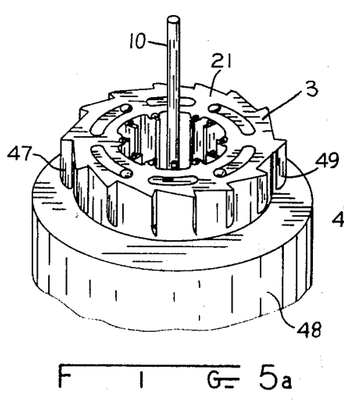
Figures 5B, 5C:
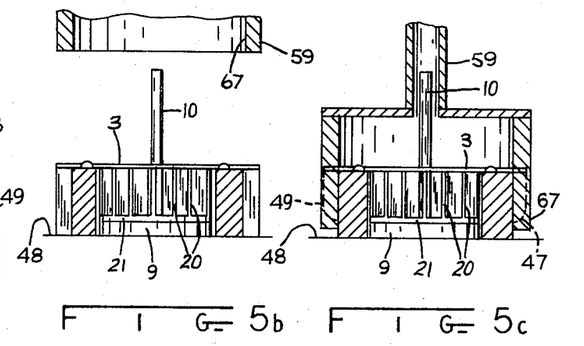
FIGS. 5b and 5c illustrate in cross section the sequence of deforming these peripheral portions.

Support 48 of fan bending press 15 supports the somewhat flexible fan stamping 3 adequately in the vicinity of rotor vanes 49 and permits a vane forming die 67 to simultaneously deform or bend the pre-slit fan vanes 49 downwardly away from the fan stamping extending the fan blades to a position substantially normal to the fan stamping as illustrated in FIG. 5a. Each press contains two hydraulic cylinders 69, 70, as shown in FIG. 6, one for moving beds 55 horizontally between their "in" and "out" and the other for lowering and retracting press ram 59 between a raised or up position and a lowered or down position.

Figure 6:
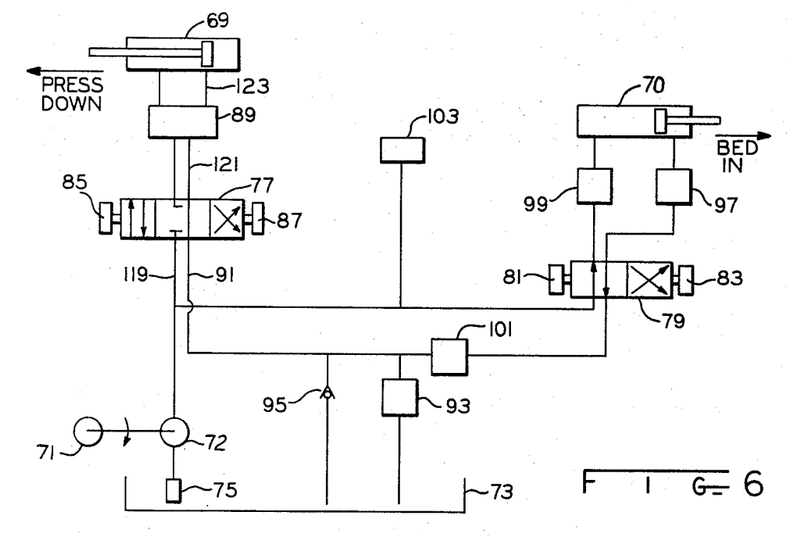
FIG. 6 is a schematic diagram of a hydraulic system each of the apparatus of FIG. 1.
Figure 7A:
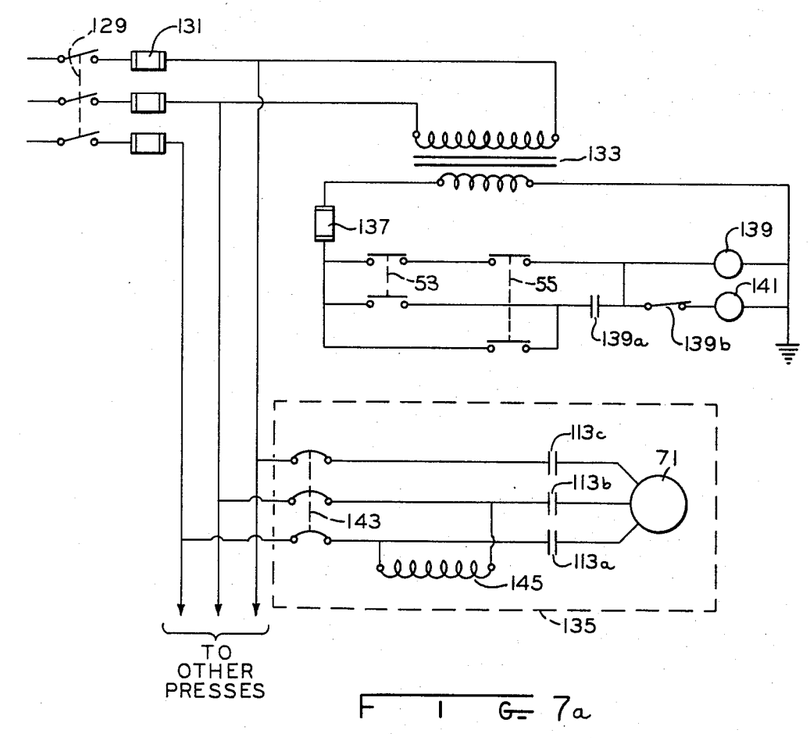
FIG. 7a is a schematic diagram of an electrical circuit for actuating the apparatus of FIG. 1.

Primary power for actuating hydraulic cylinders 69, 70 is derived from an electric motor 71 of FIGS. 6 and 7a which is coupled to a hydraulic pump 72. Pump 72 displaces hydraulic fluid from a resevoir 73 through a strainer 75 and deliver that fluid under pressure to a pair of control valves 77 and 79. Control valves 77, 79 are actuated by a plurality of solenoids 81, 83, 85 and 87 of FIGS. 6 and 7b. Control valve 77 is spring loaded to return to its central or non-operating position in the absence of energization of one of the solenoids 85, 87 where both lines 121 extending down from a double pilot operated check valve 89 are connected to the fluid return line 91 which normally returns the hydraulic fluid by way of a heat exchanger 93 to the resevoir 73. A bypass check valve 95 is also provided as a return route for hydraulic fluid in the event that fluid pressure in line 91 exceeds a preselected value, for example 15 psi. Control valve 79, under the control of solenoids 81 and 83, functions to control hydraulic cylinder 70 which moves bed 57 of FIG. 1 horizontally between its "out" position and its "in" position under press ram 59 for the various press operations. A pair of flow control valves 97, 99 as well as a pressure reducing valve 101 may be placed in the hydraulic circuit as is well known in the art.

Figure 7B:
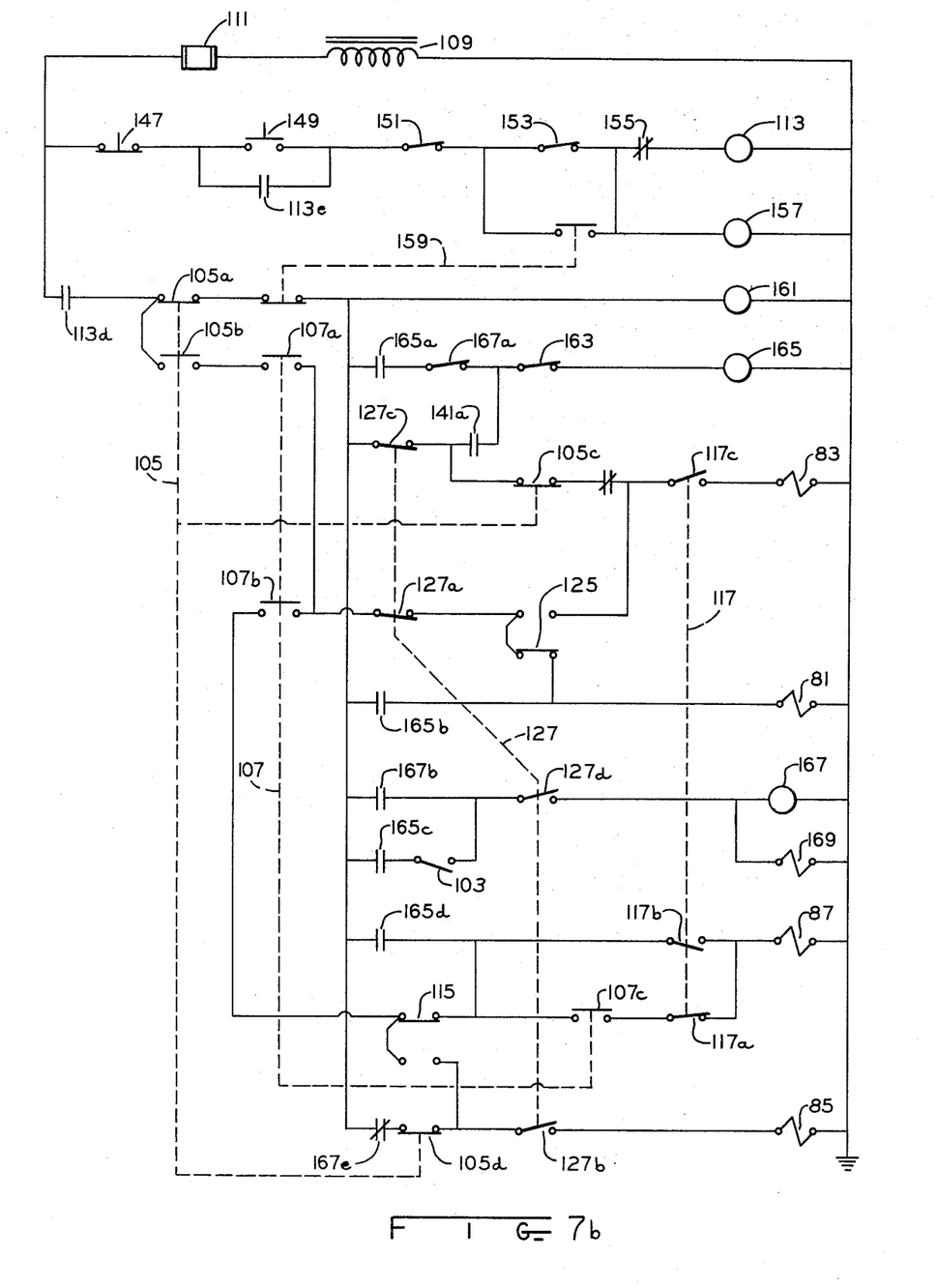
FIG. 7b is a schematic diagram of an electrical circuit for each of the apparatus for an exemplary of FIG. 1.

To illustrate the operation of the system 1, assume that press ram 59 is in its "up" position and that bed 57 is in its "out" position is toward the operator for placing one of the rotatable assemblies 7 thereon. This can be thought of as the rest position for system 1. Referring now also to FIGS. 7a and 7b, assume further that a manual-automatic select switch 105 is in its down or manual operation position opposite from the illustrated position. In the manual mode then contacts 105a would be open, 105b closed, 105c open and 105d open. A jog switch 107 may be momentarily depressed to close contacts 107a and 107b, and in this configuration, current will be supplied from the hot side of a transformer secondary 109 through a fuse 111, contacts 113d of a control relay 113 which are closed during normal operating periods, through the now closed contacts 105b and the momentarily closed contacts 107a and 107b of the jog switch to one side of a ram-up, ram-down manual selector switch 115. Switch 115 which has "neutral" "ram-up" and "ram-down" positions, is illustrated as being in its ram-down position in which it will supply current through momentarily closed contacts 107c of jog switch 107 and limit switch contacts 117a, which are closed when bed 57 is in its "out" position, to solenoid 87. Returning to FIG. 6 when solenoid 87 is actuated, valve 77 behaves as depicted in its rightmost portion and supplies fluid, under pressure, from pump 72 by way of lines 119, 121, and 123 thereby to move press cylinder 69 toward its down position.

If, while press ram 59 was in its up position, it is desired to first slide bed 57 away from the operator to its "in" position, the operator moves a manual 3-position slide position switch 125 to the bed "in" position, as illustrated in the drawing, and depresses jog switch 107 to supply current to solenoid 81. Energization of solenoid 81 causes valve 79 to direct the passage of fluid as depicted on the left portion thereof to move the bed to its "in" position.

A limit switch 117 senses the position of bed 57 and has its contacts 117a, 117b, 117c in the position illustrated when the bed is in its "out" position toward the operator. When bed 57 is in its "in" position contacts 117a are open while contacts 117b and 117c are closed. Under these circumstances, it will be clear that with bed 57 in its "in" position, energization of jog switch 107 to lower press ram 59 will be accomplished essentially as previously described except that current flow from selector switch 115 to solenoid 87 will be by way of contact 117b rather than contact 117a. A limit switch 127 senses the position of press ram 59, and when that ram is in its "up" position, switch 127 has its contacts 127a and 127c closed while its contacts 127b and 127d are open. These manual operations of an individual press will be more completely understood after considering the automatic mode of press operation.

Turning to FIG. 7a, primary power for the system 1 is derived from a three phase source by way of a main switch 129 and main line fuses 131, one phase of which is supplied to a transformer 133 which provides power to circuitry which is common to all three presses 11, 13 and 15 in the system. The three phase power is also distributed to individual presses 11, 13, 15, as for example illustrated by the circuitry enclosed in dotted line 135 for one of the three presses. The common circuitry includes a fuse 137 and the contacts of the operator palm button switches 53, 55.

Both sets of contacts for each palm button switch 53, 55 are normally open and both contact sets close when that palm button switch is depressed. The simultaneous depression of both palm button switches 53, 55 supplies energy to a time delay control relay 139 which closes contacts 139a, and after a set time delay, opens contacts 139b. Thus it will be seen that a control relay 141 will be energized for a predetermined time interval each time the operator actuates both palm button switches 53, 55. Contacts 141a controlled by control relay 141 are found in the individual press circuits of FIG. 7b.

Each of the individual presses 11, 13, 15 receives three phase power in the manner illustrated within the dotted rectangle 135. This three phase energy passes through a circuit breaker 143 and by way of motor control relay contacts 113a, 113b and 113c to the motor 71 which, as illustrated in FIG. 6, supplies the primary energy to the hydraulic system. It should also be noted that single phase energy is obtained from the line by a transformer primary winding 145, the secondary winding 109 of which is illustrated in FIG. 7b, with this transformer forming the energy link between the two schematics.

When the circuit is to be operated in its automatic mode, switch 105 is in the position illustrated in FIG. 7b as are a main stop switch 147 and a main start switch 149. A switch 151 is a normally closed knee operated emergency stop switch, and a switch 153 is a safety switch associated with the front shields (not shown) on presses 11, 13, 15, the open front portions of said presses being closed only so long as the safety shields are in their proper or down position. An overload switch 155 is normally closed in the absence of equipment problems and thus the master control relay 113 is energized closing relay contacts 113a, 113b, 113c thereof to motor 71, as shown in FIG. 7a. This last mentioned circuit also energizes a power on indicator lamp 157 on individual press control panels.

Energization of control relay 113 closes, in addition to its contacts 113a, 113b, 113c for the motor 71 and latching contacts 113e, the contacts 113d, and by way of mode switch 105 and a second safety shield position sensing switch 159, an indicator lamp 161 on the individual press control panels is also energized to indicate the particular press 11, 13, 15 is operating in its automatic mode.

As noted earlier, on depression of the two operator palm buttons 53, 55, control relay 141 is momentarily energized which closes contacts 141a, and since upon start-up in the automatic mode ram 59 is normally in its "up" position and contacts 127c closed, current is supplied by way of a normally closed part position sensing switch 163 to a cycle control relay 165. Part position sensing switch 163 is bypassed by a jumper (not shown) on the fan staking and fan bending presses 11, 15 but has, however, been found desirable to sense the proper positioning of rotatable assembly 7 on centrifugal switch staking press 13.

Energization of cycle control relay 165 closes its contacts 165a, 165b, 165c and 165d and opens contacts 165e. Contacts 165a perform a latching function to maintain control relay 165 energized until a time delay relay contact 167a opens. Contacts 165b energize solenoid 81 which actuates hydraulic cylinder 79 to move bed 57 to its "in" position. Contacts 165d energize solenoid 87 to move press ram 59 on its "down" position as soon as limit switch 117b closes indicating the bed is in its "in" position. Contacts 165c, in conjunction with pressure sensing switch 103, which is set to close when adequate ram pressure is exerted on the particular workpiece involved, energize time delay relay 167 and a cycle counter 169 since, when ram 59 is in its "down" position, contacts 127d are also closed. Contacts 167b perform a latching function, and after the expiration of a preset time delay, contacts 167a open de-energizing control relay 165. Upon de-energization, normally closed contacts 165e again return to their closed position, and since ram 59 is down and contacts 127b closed, solenoid 85 is energized to actuate the press ram back to its "up" position. When ram 59 reaches it up position, contacts 127c close, and since bed 57 is still in its "in" position with contacts 117c closed indicating such, solenoid 83 is energized thereby to move the bed back to its "out" position for removal of rotatable assembly 7 therefrom, and the sequence of the operator steps described hereinabove are repeated to place a new rotatable assembly 7 in the press. Actuation of the two palm button switches 53, 55 then causes this cycle to repeat.

It should be understood that the just described embodiment is merely illustrative of the principles of the invention and that many modifications may be made thereto without departing from the spirit and scope of the invention as set forth in the following claims.

What we claim as new and desire to secure by Letters Patent of the United States is:

1. A method of operating a single operator, multiple work station for assembling components onto a rotatable assembly for a dynamoelectric machine comprising the steps of:
   a. positioning a generally flat fan stamping onto an end portion of the rotatable assembly at one of the work stations and securing the stamping to at least a part of the end portion; and
   b. moving the rotatable assembly to another of the work stations and forming fan vanes from the stamping while it is secured to the rotatable assembly.

2. The method as set forth in claim 1, wherein the end portion includes a plurality of other vanes, and wherein said positioning and securing step comprises disposing the stamping on the other vanes for the securing of the stamping thereto.

3. The method as set forth in claim 1, comprising the preliminary step of transferring the rotatable assembly from a source thereof to the one work station.

4. The method as set forth in claim 1, comprising the preliminary step of transferring the stamping from a source thereof to the one work station.

5. The method as set forth in claim 1, comprising the preliminary step of transferring the rotatable assembly and the stamping from respective sources thereof to the one work station prior to the positioning and securing step.

6. The method as set forth in claim 1, wherein the positioning and securing step comprises staking the stamping to the end portion of the rotatable assembly.

7. The method as set forth in claim 1, wherein the moving and forming step comprises bending the fan vanes from the stamping.

8. The method as set forth in claim 7, wherein the moving and forming step further comprises extending the fan vanes away from the stamping to a position substantially normal thereto.

9. The method as set forth in claim 1, comprising the additional step of placing the rotatable assembly with the stamping secured thereto in means for storing it.

10. The method as set forth in claim 1, comprising the additional step of positioning a centrifugal device onto an end portion generally opposite to the first named end portion of the rotatable assembly at a third work station.

11. The method as set forth in claim 10, comprising the additional step of attaching the centrifugal device to the opposite end portion.

12. The method as set forth in claim 11, wherein said attaching step comprises staking the centrifugal device on the opposite end portion.

13. The method as set forth in claim 1, comprising the intermediate step of inverting the rotatable assembly with the stamping secured thereto and transferring it to a third work station.

14. The method as set forth in claim 13, comprising the subsequent intermediate step of transferring a centrifugal device from a source thereof to another end portion of the rotatable assembly generally opposite the first named end portion of the rotatable assembly, and securing the centrifugal device to the other end portion.

15. The method as set forth in claim 1, comprising the additional step of forcing a pair of retaining clips into a pair of predeterminately spaced apart grooves provided therefor in a shaft of the rotatable assembly.

16. The method as set forth in claim 1, comprising the additional step of mounting means for engagement with a thrust collar on a shaft of the rotatable assembly.

17. The method as set forth in claim 16, comprising the additional step of placing a thrust collar on the shaft for engaging said retaining means.

18. A method of operating a single operator, multiple work station system for assembling components onto at least partially completed rotatable assemblies for a dynamoelectric machine comprising the steps of:

2. removing a first completed rotatable assembly at one station from apparatus for deforming a first fan stamping secured to the first rotatable assembly;

b. transferring a second rotatable assembly having a second stamping secured thereto from apparatus for securing stampings at another station and disposing the second rotatable assembly on the deforming apparatus;

c. placing a third rotatable assembly on the securing apparatus and superposing a third stamping on an end portion of the third rotatable assembly; and d. actuating the deforming apparatus and securing apparatus generally simultaneously.

19. A method as set forth in claim 18, wherein the end portion includes a plurality of vanes, and wherein the placing and superposing step includes disposing the third stamping on the vanes.

20. A method as set forth in claim 18, comprising the intermediate step of storing the first completed rotatable assembly subsequent to the removing step.

21. A method as set forth in claim 18, wherein said actuating step comprises bending a plurality of fan vanes away from the second stamping by the deforming apparatus and staking the third stamping to the third rotatable assembly by said securing apparatus.

22. A method as set forth in claim 18, comprising the intermediate step of transferring the third rotatable assembly and the third stamping from respective sources thereof disposed adjacent the other station to the other station prior to the placing and superposing step.

23. The method as set forth in claim 18, wherein the transferring and disposing step comprises moving the second rotatable assembly from the other station to an intermediate station having apparatus for attaching a centrifugal device onto another end portion of each such rotatable assemblies opposite to that on which the stamping is secured prior to disposing the second rotatable assembly on the deforming apparatus, and also moving the second rotatable assembly having the centrifugal device attached thereto from the intermediate station and disposing the second rotatable assembly on the deforming apparatus.

24. The method as set forth in claim 23, comprising the simultaneous step of actuating the attaching apparatus generally at the same time the deforming apparatus and the securing apparatus are actuated.

25. The method as set forth in claim 23, wherein said transferring and disposing step further comprises mounting retainer means in predetermined spaced relation on a shaft of the other rotatable assembly prior to disposing it on the deforming apparatus.

26. The method as set forth in claim 23, wherein said transferring and disposing step further comprises placing thrust collars on each of the opposite ends of the shaft for engaging the retainer means subsequent to the mounting thereof and prior to disposing the other rotatable assembly on the deforming apparatus.

27. In a multiple work station system, apparatus for mounting components onto at least partially completed rotatable assemblies for a dynamoelectric machine comprising first means at one station for securing a fan stamping to an end portion of the rotatable assembly, and second means at another station for deforming the stamping when it is secured to the rotatable assembly thereby to extend a plurality of fan vanes from the stamping.

28. In the multiple work station system as set forth in claim 27, wherein the end portion includes a plurality of other vanes, and the first means being operable to secure the stamping to the other vanes.

29. In the multiple work station system as set forth in claim 27, wherein the first means is operable to stake the stamping to the end portion.

30. In the multiple work station system as set forth in claim 27, wherein the second means is operable to bend the fan vanes away from the stamping.

31. In the multiple work station system as set forth in claim 28, wherein the first means and the second means are at first and second adjacent work stations.

32. In the multiple work station system as set forth in claim 27, further comprising separate sources for the stamping and the rotatable assembly adjacent the first means.

33. In the multiple work station system as set forth in claim 27, further comprising means for simultaneously actuating the first means and the second means.

34. In the multiple work station system as set forth in claim 27, further comprising a source of switch devices, and third means at a third station for securing the switch devices to another end portion of the rotatable assembly opposite to that on which the stamping is secured.

35. In the multiple work station system as set forth in claim 34, wherein said third means is operable to stake the switch device to the other end portion.

36. In the multiple work station system as set forth in claim 34, further comprising means for generally simultaneously actuating the first means, the second means and the third means.

37. In the multiple work station system as set forth in claim 34, wherein the third station is disposed generally between and adjacent said one and other stations.

38. In the multiple work station system as set forth in claim 27, further comprising means adjacent the second means for receiving completed rotatable assemblies.

39. In the multiple work station system as set forth in claim 27, wherein the rotatable assembly includes a shaft adapted to receive retaining means, and third means for mounting the retaining means in predetermined spaced apart relation on said shaft.

40. In the multiple work station system as set forth in claim 39, wherein said third means comprises a pair of holders for the retaining means spaced apart in the predetermined relation, the shaft being forced into said holders into mounting engagement with the retaining means.

41. In the multiple work station system as set forth in claim 27, wherein said first means comprises a press for securing the stamping to the end portion.

42. In the multiple work station system as set forth in claim 27, wherein said second means comprises a press for deforming a peripheral portion of the stamping thereby to bend the fan vanes therefrom and extend them to a position generally normal to the stamping.

43. In the multiple work station system as set forth in claim 34, wherein said third means comprises a press for securing the switch device to the other end portion.

44. The method as set forth in claim 18, comprising the intermediate step of moving one of the first and second rotatable assemblies from one of the one and other stations to a third station having apparatus for attaching a centrifugal device onto another end portion opposite the first named end portion of the one of the first and second rotatable assemblies.

45. The method as set forth in claim 44, comprising the simultaneous step of actuating the attaching apparatus generally at the same time the deforming apparatus and the securing apparatus are actuated.

* * * * *

UNITED STATES PATENT OFFICE
CERTIFICATE OF CORRECTION

PATENT NO. : 3,866,314
DATED : February 18, 1975
INVENTOR(S) : William M. Stone and John M. Brunschwig It is certified that error appears in the above-identified patent and that said Letters Patent are hereby corrected as shown below:

Inventor's name misspelled, change "Braunschwig" to
        --Brunschwig--.
Col. 1, line 62, delete "tan" and insert --fan--.
Col. 10, line 1, delete "2." and insert --a.--.
Col. 11, line 12, delete "28" and insert --27--.

Signed and sealed this 1st day of July 1975.

(SEAL)
Attest:

RUTH C. MASON
Attesting Officer

C. MARSHALL DANN
Commissioner of Patents
and Trademarks